(12) United States Patent
Raghuraman et al.

(10) Patent No.: US 7,512,543 B2
(45) Date of Patent: Mar. 31, 2009

(54) TOOLS FOR DECISION-MAKING IN RESERVOIR RISK MANAGEMENT

(75) Inventors: Bhavani Raghuraman, Wilton, CT (US); Benoit Couet, Weston, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 1120 days.

(21) Appl. No.: 10/328,212

(22) Filed: Dec. 23, 2002

(65) Prior Publication Data

US 2003/0225606 A1 Dec. 4, 2003

Related U.S. Application Data

(60) Provisional application No. 60/384,065, filed on May 29, 2002.

(51) Int. Cl.
G06F 9/44 (2006.01)
G06F 7/60 (2006.01)
G06G 7/48 (2006.01)

(52) U.S. Cl. .................. 705/7; 703/2; 703/9; 703/10

(58) Field of Classification Search .............. 705/7; 703/2, 9, 10
See application file for complete search history.

(56) References Cited

U.S. PATENT DOCUMENTS

| | | | | |
|---|---|---|---|---|
| 5,148,365 A | * | 9/1992 | Dembo | 705/36 R |
| 5,924,048 A | * | 7/1999 | McCormack et al. | 702/13 |
| 5,992,519 A | * | 11/1999 | Ramakrishnan et al. | 166/250.15 |
| 6,128,579 A | * | 10/2000 | McCormack et al. | 702/13 |
| 6,182,014 B1 | * | 1/2001 | Kenyon et al. | 702/14 |
| 6,205,402 B1 | * | 3/2001 | Lazaar et al. | 702/2 |
| 6,895,383 B2 | * | 5/2005 | Heinrich | 705/7 |
| 6,980,940 B1 | * | 12/2005 | Gurpinar et al. | 703/10 |
| 7,006,992 B1 | * | 2/2006 | Packwood | 705/38 |
| 2004/0215551 A1 | * | 10/2004 | Eder | 705/38 |
| 2005/0071266 A1 | * | 3/2005 | Eder | 705/38 |

OTHER PUBLICATIONS

Couet, Benoit; Raghuraman, B.; Savundararaj, P.; Burridge, R. "How Do We Perform Stochastic Reservoir Optimization?". May 21, 2002. presented Feb. 1, 2002 at the 2001-2002 IMA/MCIM Industrial Problems Seminar.*

Heinemann, Robert F.; Lyons, Stephen L.; Vasantharajan, Sriram. "Next Generation Reservoir Optimization". Jan. 1998. World Oil. vol. 219, Issue 1, p. 47, 6p.*

(Continued)

Primary Examiner—Jonathan G Sterrett
Assistant Examiner—Peter Choi
(74) Attorney, Agent, or Firm—James McAleenan; Vincent Loccisano; Jody Lynn DeStefanis (57) ABSTRACT

The present invention discloses a method for performing a stochastic analysis of one or more hydrocarbon reservoir exploitation strategies taking into consideration one or more uncertain parameters. The method optimizes an objective function that considers the gain in value of a reservoir management goal attributable to these exploitation strategies. The methodology may be used to decide whether or not to implement a strategy. Alternatively, it may be used to decide which competing strategy will yield the maximum benefit. In another embodiment of the present invention, the value of information obtained from the installation of additional sensors or new measurements is also considered.

11 Claims, 8 Drawing Sheets

OTHER PUBLICATIONS

Amit, Raphael. "Petroleum Reservoir Exploitation: Switching from Primary to Secondary Recovery". Jul.-Aug. 1986. Operations Research. vol. 34, Issue 4. pp. 534-549.*

Lason, Leon; Coffman Jr., Paul E.; MacDonald, Robert; McFarland, James W.; Sepehrnoori, Kamy. "Optimal Hydrocarbon Reservoir Production Policies". Jan.-Feb. 1986. Operations Research. vol. 34, Issue 1. pp. 40-54.*

Ierapetritou, M.G.; Floudas, C.A.; Vasantharajan, S.; Cullick, A.S.; "Optimal Location of Vertical Wells: A Decomposition Approach". 1999.*

Dietrich, J.K; Rester, S.; "Program Distributes Rock Properties for Reservoir Modeling". Aug. 21, 2000. Oil & Gas Journal. vol. 98, Issue 34. p. 36-41.*

Guyaguler, Baris. "Optimization of Well Placement and Assessment of Uncertainty". Mar. 27, 2002.*

Buyaguler, Baris; Horne, Rolan N.; "Uncertainty Assessment of Well Placement Optimization". 2001. Society of Petroleum Engineers, Inc.*

Motta, R.; Caloba, G.; Almeida, L.; Moreira, A.; Nogueira, M.; Cardoso, L.; Berlink, L.; "Investment and Risk Analysis Applied to the Petroleum Industry". 2000. Society of Petroleum Engineers, Inc.*

Pan, Yan; Horne, Roland N.; "Improved Methods for Multivariate Optimization of Field Development Scheduling and Well Placement Design". 1998. Society of Petroleum Engineers, Inc.*

Adams, T. et al. "Portfolio Management for Strategic Growth". *Oilfield Review*, vol. 12, No. 4, (2000), pp. 10-19.

Algeroy, J. et al. "Controlling Reservoirs from Afar". *Oilfield Review*, vol. 11, No. 3, (1999), pp. 18-29.

Bailey, W. et al. "Taking a Calculating Risk". *Oilfield Review*, vol. 12, No. 3, (2000), pp. 20-35.

Bevington, P. R. et al. "Data Reduction and Error Analysis for the Physical Sciences". *McGraw-Hill*, (1992).

Bryant, I. D. et al. "Permanent Monitoring of a Waterflood Using Cemented Resistivity Arrays: Indiana, USA". *EAGE 63rd Conference*, Paper M020, (Jun. 11-15, 2001), pp. 2-4.

Burridge, R. et al. "Optimal Stimulation of Oil Production". *Decision Making Under Uncertainty: Energy and Power, IMA Volumes in Mathematics and Its Applications*, vol. 128, (2002), pp. 17-37.

Coopersmith, E. et al. "Making Decisions in the Oil and Gas Industry". *Oilfield Review*, vol. 12, No. 4, (2000), pp. 2-9.

Couet, B. et al. "Optimization Under Reservoir and Financial Uncertainty". *Conference on the Mathematics of Oil Recovery (ECMOR)*, (presented Sep. 2000).

Eck, J. et al. "Downhole Monitoring: The Story So Far". *Oilfield Review*, vol. 11, No. 4, (1999), pp. 20-33.

Fathi, Z. et al. "Use of Optimal Control Theory for Computing Optimal Injection Policies for Enhanced Oil Recovery." *Automatica*, vol. 22, (1986), pp. 33-42.

Press, W. H. et al. "Numerical Recipes in Fortran". *Cambridge Univ. Press*, (1992).

Raghuraman, B. et al. "Interference Analysis of Cemented-Permanent-Sensor Data from a Field Experiment". *EAGE 63rd Conference*, Paper M019, (Jun. 11-15, 2001).

Ramirez, W. F. "Application of Optimal Control Thoery to Enhanced Oil Recovery." *Elsevier*, (1987).

Rundgren, et al. "Installation of Optimal Completions in the Oseberg 30/9-B-38 B Well". *SPE Annual Tech. Conf. and Exhibition*, Paper SPE 71677 (Sep.-Oct. 2001).

* cited by examiner

TOOLS FOR DECISION-MAKING IN RESERVOIR RISK MANAGEMENT

RELATED APPLICATIONS

The present invention claims priority from U.S. Provisional Application Serial No. 60/384,065 filed May 29, 2002, incorporated herein by reference in its entirety.

FIELD OF INVENTION

The present invention relates to reservoir management. More particularly, the present invention relates to a method for decision-making in reservoir risk management that includes a stochastic reservoir model and optionally accounts for the value of information.

BACKGROUND TECHNOLOGY

Due to the inaccuracy of logging tools and unpredictable natural variations in geometry and geological parameters, there is considerable uncertainty as to the detailed characterization of a hydrocarbon reservoir. This uncertainty, coupled with the dramatic variations in the market value of hydrocarbon production, has heightened the importance of financial factors and risk management in reservoir strategies so as to maximize reservoir value.

Reservoir risk management involves optimizing assets given inherent reservoir uncertainties and minimizing risk by reducing these uncertainties. Optimizing assets usually involves making decisions about technologies and strategies (such as advanced completion systems, drilling a new well, setting injection or production target rates, etc.) and quantifying the value of implementing the proposed technology in the presence of physical and financial uncertainties. Physical uncertainty includes uncertainty in the type of reservoir model used and the properties used to populate the model. Financial uncertainties refer to uncertainty in the financial variables associated with the asset, such as the discount rate, hydrocarbon price, etc. The optimization process thus should be stochastic, with a risk level (or alternatively a confidence level) associated with the optimized solution. Based on the cost-benefit analysis (cost of implementing the technology versus the gain or value from the implementation) and the associated risk level, a decision may be made on implementing the technology. Minimizing the risk level involves gathering information about the reservoir to reduce or eliminate the inherent uncertainties. The cost of gathering this information should be balanced against the value the information brings to the stochastic optimization process. Valuation of information can then guide decisions on implementing monitoring technologies for uncertainty reduction.

Risk analysis has taken a much more prominent role since the late 1990's when hydrocarbon production costs significantly fluctuated. The oil and gas industry has taken a harder look at the technology available to perform more accurate and more efficient risk analysis. Bailey et al.'s "Taking a Calculated Risk," Oilfield Review, Vol. 12, No. 3, pages 20-35 (2000) (incorporated by reference herein in its entirety) surveyed the major topics of interest to perform risk analysis at various degrees as well as the role and impact these techniques have on the operators in the petroleum industry. This was further exemplified using an extensive case study of a development offshore in Coopersmith et al.'s "Making Decisions in the Oil and Gas Industry," Oilfield Review Vol. 12, No. 4, pages 2-9 (2000) (incorporated by reference herein in its entirety). As the oil and gas industry shifts its emphasis from profit by cost-cutting to a diversification of asset-management practices, global portfolio optimization akin to what is prevalent in the financial market industry could potentially be an extremely valuable exercise as shown by Adams et al. in "Portfolio Management for Strategic Growth," Oilfield Review, Vol. 12, No. 4, pages 10-19 (2000) (incorporated by reference herein in its entirety).

Current industry practice for consideration of uncertainty in oilfield risk analysis typically involves multiple realizations of a given reservoir model (the level of sophistication ranging from simple spreadsheet tank [Material Balance] models to a geologically detailed full-scale model). This approach to reservoir risk analysis is not amenable to true stochastic optimization. For example, the optimum flow rates for wells in a faulted reservoir will depend strongly on the transmissibility of these faults that are often uncertain and can significantly affect the fluid flow in the reservoir. Hence, to obtain the optimum flow rates, one needs to integrate the fault transmissibility uncertainty and its effect on fluid flow into the stochastic optimization routine. This is not feasible with current treatments of uncertainty.

An optimization methodology for deterministic reservoirs (without any uncertainties in reservoir parameters) was applied in the 1980's to determine the optimum injection strategy for surfactants by optimizing the difference between gross revenue and the cost of injection chemicals. This methodology is described by Fathi et al. in "Use of Optimal Control Theory for Computing Optimal Injection Policies for Enhanced Oil Recovery," Automatica, Vol. 22, pages 33-42 (1984) (incorporated by reference herein in its entirety) and by Ramirez in *Applications of Optimal Control Theory to Enhance Oil Recovery* (1987) (incorporated by reference herein in its entirety). More recently, commonly owned U.S. Ser. No. 09/930,935 to Couet et al. (the '935 application) and Burridge et al. "Optimal Stimulation of Oil Production," Decision Making under Uncertainty: Energy and Power, IMA Volumes in Mathematics and Its Applications, Vol. 128, pages 17-37 (2002) (incorporated by reference herein in their entireties) address the extended issue of optimization of oil recovery subject to various physical uncertainties (stochastic optimization) and minimization of downside risk.

While these studies describe algorithms for stochastic optimization of reservoirs, they do not provide methodologies for formulating objective functions suitable for decision-making. As will be shown below, useful methodologies should allow for decisions based on a cost-benefit analysis for a technology implementation or choosing between technologies in the presence of uncertainties. This requires direct optimization of the difference between the value of the management goal (such as net present value, hydrocarbon production etc.) obtained when the technology is implemented and the value of the goal obtained for a reference case without that technology. The optimization of this difference or gain in value of a goal in accordance with the present invention is in contrast to the traditional approach that only considers the difference between the individually optimized values of the goal for the two cases. The results can be very different for the two approaches as values of the goal obtained for both the technology and reference cases are dependent on the inherent reservoir uncertainties. Accordingly, there is a need for a method that accounts for the affect of inherent reservoir uncertainties, such as in cost-benefit analysis. Furthermore, there are no existing methodologies to account for the gain in value of a goal associated with the reduction in uncertainty due to acquisition of new information, which can be defined as the value of information.

Accordingly, it is an object of the present invention to provide methods for decision-making in reservoir risk management that are stochastic and account for the gain in value attributable to one or more hydrocarbon exploitation strategies/technologies, wherein this gain in value of the goal is defined as the value of that strategy/technology.

It is yet another object of the present invention to provide decision-making methods which further account for one or multiple uncertainties in reservoir properties.

It is also an object of the present invention to provide methods that allow the quantification of the value of information in reservoir risk management.

SUMMARY OF THE INVENTION

The present invention discloses a method for performing a stochastic analysis of one or more hydrocarbon reservoir exploitation strategies taking into consideration one or more uncertain parameters. The method optimizes an objective function that considers the gain in value of a goal (such as NPV, hydrocarbon production etc.) attributable to these exploitation strategies. The methodology may be used to decide whether or not to implement a strategy. Alternatively, it may be used to decide which competing strategy will yield the maximum benefit.

In one embodiment, a method for managing risk associated with one or more hydrocarbon reservoir exploitation strategies is disclosed comprising: (a) developing a reservoir model that incorporates a stochastic model of one or more uncertain model parameters; (b) identifying one or more goals for optimization; (c) identifying one or more hydrocarbon reservoir exploitation strategies for achieving one or more goals based on the reservoir model and associated uncertain parameters; (d) identifying control variables and restraints associated with each of the one or more decision strategies; (e) determining a set of equally probable scenarios for the reservoir model (i.e., 'N' scenarios realizable due to the uncertainties in the reservoir parameters); (f) formulating an objective function based on the goals to determine the gain in value attributable to the hydrocarbon reservoir exploitation strategies; and (g) optimizing the objective function using the 'N' scenarios and the control variables and restraints for each of the one or more hydrocarbon reservoir exploitation strategies to determine the gain in value at one or more risk aversion levels. A non-limiting exemplary list of potential goals for optimization include maximizing net present value, maximizing hydrocarbon production, maximizing return on investment, minimizing cost, and maximizing hydrocarbon drainage. Likewise, a non-limiting exemplary list of hydrocarbon reservoir exploitation strategies includes installing control technology, drilling additional wells, upgrading surface facilities and performing well workovers. One skilled in the art would recognize that other goals and strategies might be appropriate in the field of hydrocarbon reservoir exploitation.

Optionally, the method of the present invention may include consideration of the value of additional information (such as that collected from additional sensors or new measurements). Accordingly, the method may further comprise determining a new set of equally probable reservoir model scenarios based on potential reduction in uncertainty attributable to the collection of additional information. The stochastic optimization is now done over this new set of 'N' scenarios using the previously developed objective function at one or more risk aversion levels to determine the optimum gain. In this embodiment, this optimized gain may be compared to the gain without collecting information at one or more common preferred risk levels to determine the value of the additional information. The value of the additional information may be compared to the cost of collecting the information.

Further, the method of the present invention may be adapted to determine the value of perfect information where all the uncertainty is assumed to be completely eliminated. In such a model, each of the first set of equally probable reservoir model scenarios is treated as a deterministic case and independently optimized. The difference in gains between the deterministic optimization and the stochastic optimization at a preferred risk level for each scenario would be the value of perfect information (maximum benefit of any measurement or sensor) if that scenario happened to be the true reservoir model. Because the true scenario is unknown a priori, an average of these values for all the equally probable scenarios gives an average value of perfect information for that reservoir.

For a preferred risk aversion level, $\lambda$ the objective function, $F_\lambda$, may be formulated using the utility function of the '953 application, but where the mean, $\mu$ is the mean of the gains in value of the goal and the standard deviation, $\sigma$ is the standard deviation of these gains as:

$$F_\lambda = \mu - \lambda\sigma, \text{ where } \mu = \sum_i w_i g_i, \sigma = \sqrt{\sum_i w_i (g_i - \mu)^2},$$

and where $w_i$ is $1/N$; $g_i$ is the gain for scenario i. N is the number of equally probable reservoir model scenarios and is equal to $n^m$, where n is the number of discrete points in each of the uncertain parameters and m is the number of uncertain parameters.

While this is the preferred formulation of the objective function, one skilled in the art would recognize that other stochastic objective functions (using different combinations of the mean and standard deviation) to maximize gain and minimize risk could be employed in accordance with the present invention. The objective function may further account for the cost of implementing the exploitation strategy and therefore provide a basis for a cost-benefit analysis. Further, the objective function may include a (stochastic) pricing model.

To assist in the decision-making process, the gain in values of the goal determined in the present invention may be presented in a decision table or efficient frontier for various risk aversion factors or levels.

Further details, features and embodiments of the invention will become more readily apparent from the detailed description that follows.

BRIEF DESCRIPTION OF THE DRAWINGS

FIGS. 1(a)-(c) are schematics showing the methodology of the present invention.

FIGS. 6(a) and (b) are charts of the value of perfect measurement (i.e., sensor value): (a) as a function of aquifer PI for a fixed width of 700 feet and (b) as a function of width of high permeability zone for a fixed aquifer of PI equal to 4500 bpd/psi.

DETAILED DESCRIPTION OF THE INVENTION

Reservoir risk management involves optimizing assets given inherent reservoir uncertainties and minimizing risk by reducing these uncertainties. The decision to implement any reservoir management technology is usually based on a cost-benefit analysis. Consequently, the correct valuation of value-adding technology (where the valuation could be based on net present value, hydrocarbon production, etc.) becomes a significant part of a reservoir management process. A crucial underlying factor in such an analysis is the uncertainty in the reservoir model and its properties, and in the financial variables associated with the asset. The former includes, for example, uncertainty in properties such as reservoir geometry or permeability in the reservoir, while the latter refers to uncertainty in financial parameters such as discount rate or hydrocarbon price.

The present invention discloses methods for the valuation of technology and information related to reservoir risk management. For demonstration purposes, these techniques are applied to valuation of control technologies in a reservoir with single as well as multiple uncertainties in its physical properties. Due to the presence of these uncertainties, valuation includes a stochastic optimization of one or more hydrocarbon reservoir exploitation strategies, where the objective function includes a risk aversion factor. By applying these techniques, a decision table may be generated showing the optimum gain in the value of the reservoir management goal (such as NPV, hydrocarbon production) at various confidence/risk aversion levels due to implementation of a technology. The analysis may be further extended to estimate the added value to the reservoir if the uncertainties were to be reduced (or even eliminated) by implementing appropriate monitoring technologies. This process enables quantification of the value of information (i.e., sensor value) and is useful in designing monitoring strategies to collect information.

Such techniques are applicable in cost-benefit analysis and other decision-making activities for reservoir risk management and can, therefore, be used as tools for the valuation, pricing, and marketing of technology.

The specific control technology applied in the example chosen to demonstrate the methods of the present invention is an advanced completion systems (ACS; also known as smart or intelligent completion system) as disclosed in: (1) Rundgren, et al.'s "Installation of Advanced Completions in the Oseberg 30/9-B-38B Well," paper SPE 71677 presented at the SPE Annual Technical Conference and Exhibition, New Orleans, Sept. 30-Oct. 3, 2001; and (2) Algeroy, et al.'s, "Controlling Reservoirs from Afar," Oilfield Review Vol. 11, No. 3, pages 18-29 (1999). These articles are incorporated by reference herein in their entireties. ACS enable control of fluid flow into selective completed zones of the well through variable choke valves that can be remotely controlled at the surface. By adjusting the valve opening, the flow or producing pressure can be set in the completion zone to any desired value. This allows the manipulation of the fluid flow in the reservoir for more efficient performance and hence an increase in the value of the goal being optimized. Note that while the "Value of Technology" examples below choose the maximization of Net Present Value (NPV) as the goal being optimized and the implementation of ACS technology as the exploitation strategy, the present invention may be equally adapted to optimizing other goals using other strategies.

Information about reservoir parameters (i.e., the uncertain parameters) may be obtained by making new measurements using surface or downhole sensors, temporarily or permanently installed, including wireline logging of wells. The cost of obtaining information from such sensors needs to be balanced against the expected benefit to the goal being optimized. Accordingly, in the example below (with respect to "Value of Information"), NPV is optimized. While the examples below choose the maximization of NPV as the goal to be optimized, the present invention may be equally adapted to optimizing other goals as well. Throughout this specification, NPV will be representative of all potential goals for optimization. The cost of collecting additional reservoir information may include not only the hardware cost but also the cost of interpreting measurements. Valuation of additional information can help determine the pricing structure for this interpretation.

The present invention uses a stochastic approach that accounts for the gain in value of a chosen goal (such as NPV in the examples below) attributable to the proposed exploitation strategy (such as ACS in the examples below). The continuous distribution of the one or more uncertain parameters may be approximated by N equally probable reservoir model scenarios, such that the mean and standard deviation of these N points is equal to the original mean and standard deviation. The gain in value of the goal chosen for optimization (such as NPV) that is due to the implementation of the exploitation strategy (such as ACS) is calculated for each of these N scenarios. The mean $\mu$ (and standard deviation $\sigma$) of the NPV gain for the stochastic case is then the weighted NPV gain (and weighted standard deviation) of the N possible scenarios:

$$\mu = \sum_i w_i g_i, \tag{1}$$

$$\sigma = \sqrt{\sum_i w_i (g_i - \mu)^2} \tag{2}$$

where $w_i$ here is $1/N$ and $g_i$ is the gain for scenario i. N is equal to $n^m$, where n is the number of discrete points in each uncertain parameter and m is the number of uncertain parameters. Accordingly, in situations where there is only one uncertain parameter, m=1 and N=n. Where there are two uncertain parameters, m=2 and N=$n^2$; where there are three uncertain parameters, m=3 and N=$n^3$, etc.

1. Valuation of Technology

Figure 1A:
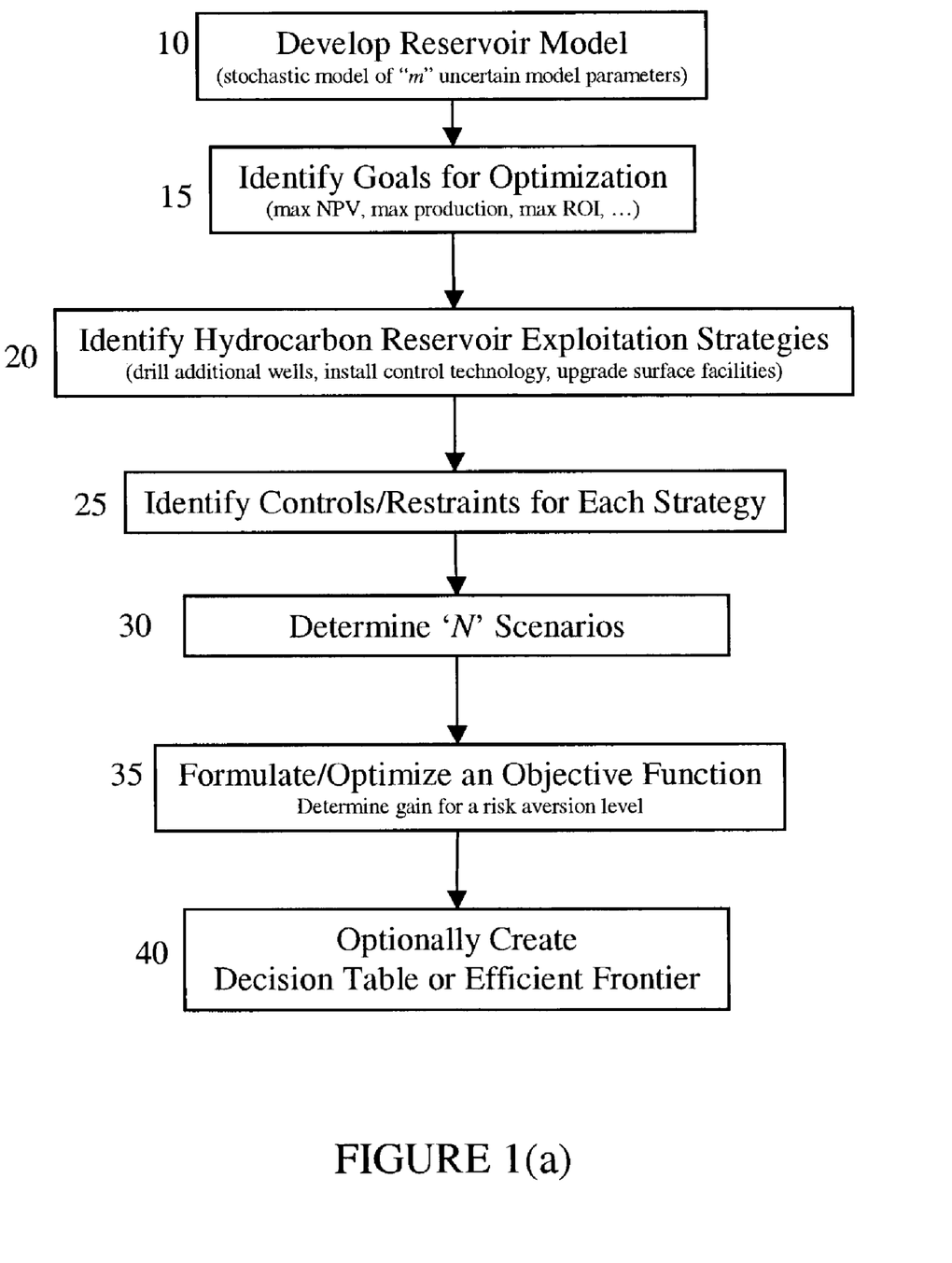
FIG. 1(a) is a schematic accounting for the value of the exploitation strategy/technology.

As shown in FIG. 1(a), the formulation of the reservoir risk management problem starts with a description of the reservoir model 10. Preferably, this model should be as complete as possible and should be modeled using a reservoir simulator. Most preferably, most, if not all, of the uncertain parameters should be identified, such as permeability, geometry etc. The model should include a statistical (stochastic) description of their distributions (such as normal or lognormal distributions). Next, it includes identification of the main goals in managing the reservoir 15. The goals could include maximizing Net Present Value (NPV) over a fixed time frame, maximizing hydrocarbon production, maximizing return on investment (ROI), maximizing reservoir hydrocarbon drainage, minimizing cost, etc. Next, one or more decision strategies (also called hydrocarbon reservoir exploitation strategies) that would possibly allow for achieving these goals should be identified 20. This could include a decision on implementing a new control technology for improving hydrocarbon recovery, drilling a new well, upgrading surface facilities, etc. It could also be the choice of one technology over the other such as drilling multiple horizontal wells vs. a multilateral well, drilling a vertical well vs. a horizontal well, etc. For each strategy, there are associated control variables and constraints 25. For example, for a strategy to implement variable choke valves in hydraulically isolated zones of a well (ACS technology), the associated control variables may include the number of completion zones, flow rate from each zone, etc. and the constraints may include total flow rate bounds, pressure limits, etc.

The next step is to determine the 'N' equally probable reservoir model scenarios 30 arising due to the 'm' uncertain parameters. An objective function is then formulated 35 to allow for stochastic optimization to determine the gain in the value of the goal due to an exploitation strategy at one or more risk aversion levels, preferably at one or more risk aversion levels that reflect the decision-maker's risk aversion preference (also referred to as a "preferred risk aversion level"). The function may also include a pricing model that will allow reservoir outputs to be converted to monetary units. The pricing model itself could be deterministic with fixed financial properties or stochastic with fluctuations in financial properties, such as hydrocarbon price. Optionally, a decision table or efficient frontier may be developed 40 based on the optimized objective function 35. Note that the decision table/efficient frontier may be developed for various risk aversion levels greater than or equal to zero.

The objective function should be formulated so that it provides for decision-making in the presence of uncertainties. If the exploitation strategy is installation of ACS, the benefit is the added value (or gain) to the reservoir management goal due to the implementation of that system. The objective function is hence formulated as the added value to the goal being optimized due to the implementation of this technology given the associated uncertainties in reservoir properties. Thus, for example, it could be increase in NPV from the reservoir production due to ACS implementation. For a deterministic evaluation of the benefit of the technology, the conventional practice is to maximize the NPV with ACS and compare with a reference case where there are no ACS. The difference is the added value of the technology, which can be compared to the cost of implementing the technology.

For the deterministic case, the optimization results are the same whether one optimizes for absolute value or the gain in value of the goal (such as NPV). This is not true when performing a stochastic optimization. The present invention proposes a stochastic evaluation of the technology by defining the objective function to be directly the difference between the optimum value of the goal with the exploitation strategy (for example, NPV with ACS) and the optimum value of the goal for the reference case (i.e., the NPV without ACS). The reference case is also a function of uncertainty and, hence, the gain attributable to the technology will be dependent on the uncertain variable values. By defining the objective function to be the gain in value of the goal (NPV) due to the technology implementation (ACS), the utility function proposed in the '935 application may be applied. For the example where the goal is maximizing NPV, the mean is now the mean gain in NPV and the standard deviation is the standard deviation in NPV gains. This allows the optimization algorithm to account for the fact that the NPV of both the ACS case and the reference case are dependent on uncertain parameters. The output may be a decision table (as shown below) or an efficient frontier (as described in the '935 application).

Depending on the purpose of reservoir management, the objective function could represent the added hydrocarbon production, increase in recovery, or reduction in water for the technology-implemented case as compared to a reference case without the technology. Thus, for example, hydrocarbon production maximization could be chosen as the goal to be optimized. The objective function would then be formulated based on the gain in hydrocarbon production due to ACS implementation as compared to the reference case hydrocarbon production in the absence of ACS technology. Further, one could also formulate the objective function to be the difference in value of the goal being optimized for two cases with competing strategies. For example, the objective function could be the difference in NPV when a horizontal well is being drilled as opposed to a vertical well. In this case, the reference case could be the drilling of a vertical well. Accordingly, the method of the present invention allows decision-making whereby one decision strategy serves as a reference case and the gain attributable to one or more alternative strategies are measured relative to the reference case.

EXAMPLES

Figure 2:
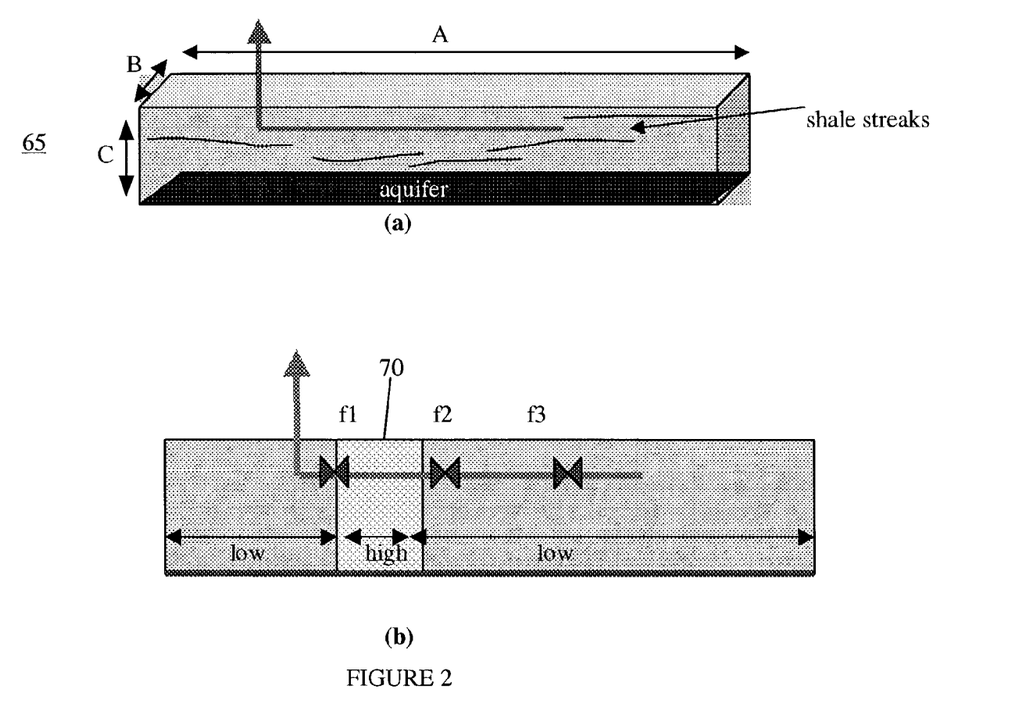
FIG. 2(a) is a graphical depiction of a reservoir with shale breaks.
FIG. 2(b) is a schematic representation of lateral variation in effective vertical permeability due to shale breaks.

FIGS. 2(a) and (b) give details of a reservoir used as an example to demonstrate a non-limiting embodiment of the present invention. As shown in FIG. 2(a), the reservoir 65 is 6,000 feet by 3,100 feet, 100-ft thick with an aquifer water drive, shown as A, B, and C, respectively. The reservoir is shaly sand and breaks in the shale cause lateral variation in effective vertical permeability as shown in the FIG. 2(b). The producer well has three isolated zones whose flow rates can be independently controlled through variable choke valves. Optimum flow rates (f1, f2, f3) have to be determined such that gain in NPV due to ACS implementation is maximized and constraints honored. There is uncertainty in the width of the high permeability zone 70 as well as the strength of the aquifer support. The width of the high permeability zone affects fluid flow and water breakout and hence the reservoir production. The aquifer productivity index (PI) is a measure of the strength of the aquifer and reflects its ability to maintain reservoir pressure during production. A weak aquifer with a low PI causes the reservoir pressure to decline faster for the same production rate. If a bubble pressure constraint exists, as in this case, a lower aquifer PI would limit the reservoir production. Thus, the uncertainty in these properties impacts reservoir management. The goal of reservoir management here is to maximize NPV and a possible exploitation strategy identified is implementation of an ACS. Without ACS, the water is expected to quickly breakthrough in the section of high effective vertical permeability. However, if the well is divided into a number of advanced completion zones (three in this case) with a variable choke valve in each, then it is possible to adjust the choke settings (and hence the flow rates) in an optimal way to produce the reservoir efficiently. The gain realized in NPV by implementing ACS with optimum flow rates is the potential benefit of using this technology.

In this example, the goal is to maximize this gain in NPV over a two-year period and the exploitation strategy is to install ACS. Due to the uncertainty in the physical properties, a total of two in this example, a stochastic optimization and evaluation of the reservoir is preferred to make a decision on implementing ACS technology. The reference case NPV (in the absence of ACS) depends on the width of the high permeability zone as well as on the aquifer strength. The gain in NPV also depends on these parameters. Thus, for fixed aquifer strength, the reference NPV is likely to be higher for a smaller width of the high permeability zone because of lower water cuts, but the gain from implementing the ACS technology will be lower. The reverse is true for a larger width of the high permeability zone.

For a deterministic evaluation, there is only one likely scenario and it does not matter if one optimizes for maximum NPV or gain in NPV; the result is the same. For a stochastic optimization with multiple uncertainties, there are multiple scenarios of the reservoir model with varying probabilities. Accordingly, there is a distribution of NPV's for the reference case and a different distribution of the gains in NPV due to ACS corresponding to the flow rates chosen. It is important, in doing a stochastic evaluation of implementing ACS technology, to maximize the gain in NPV, as the decision is based on the gain from implementing ACS versus the cost of the technology, rather than on the absolute value of NPV. A conventional deterministic evaluation as is practiced today as well as a more comprehensive stochastic evaluation in accordance with the present invention are provided below. Schlumberger's Eclipse™ simulator was used to model the fluid flow in the reservoir while the price of oil was taken to be constant and the interest rate was fixed in time.

Deterministic evaluation: Conventionally, a deterministic evaluation is performed in which a most likely value for the two uncertain parameters is picked and the control case is compared to a reference case as shown in Table 1 below.

TABLE 1

Cost-Benefit Analysis of ACS

| Cost-Benefit Analysis |
|---|
| NPV without ACS |
| $79.2 MM |
| NPV with ACS |
| $90.6 MM |
| Gain due to ACS |
| $11.4 MM |
| Cost of 3 ACS |
| $2.25 MM |
| Benefit of ACS > Cost |

The reference case is the case in which the technology is not implemented, i.e., its corresponding NPV is obtained by operating the well without ACS. Constraints include staying above bubble pressure and keeping the total flow rate fixed at 10,000 barrels per day (bpd). Table 1 summarizes the benefit of using ACS with optimum flow rates for a 700-ft wide high permeability zone and an aquifer PI of 4,500 bpd/psi. The gain from using this technology is the difference in NPV between the ACS case (using three advanced completion zones with optimum flow rates) and the reference case. The average cost of a single system is about $0.75 MM. Thus the gain in NPV over a 2-year period ($11.4 MM) pays back the cost of investing for the three completions ($2.25 MM) today.

The conventional way to consider uncertainty is to evaluate the scenarios at upper and lower bounds of the uncertain parameters. Thus, a 'worst case scenario' can be considered wherein the least gain is expected. However, this number does not indicate the probability of getting this scenario or how this gain should be incorporated with the most likely scenario to make a decision on implementing this technology. There is no information about the risk level and the gain expected or what the optimum strategy should be. If one chooses to use the optimum flow rates corresponding to the most likely case, then there is no knowledge of the downside risk. There is no knowledge of the risk involved if the uncertain parameters have values different from their medians. Furthermore, there is no way to evaluate the value of information.

Stochastic reservoir scenario—one uncertain parameter: In the preceding example, two uncertain parameters were identified. For simplicity, only one of the uncertain parameters, the width of the reservoir, will be considered here; the example below will account for concurrent consideration of both uncertain parameters. In reality, it is likely that a range of width values around a most likely value would be known rather than the exact width. This raises the question as to how to value the technology and determine if an ACS will pay back its cost, given this uncertainty in width. Based on prior knowledge from log interpretations, the variation in the width of this zone is assumed to be a normal distribution with a mean of 700 ft and a standard deviation of 327 ft. The continuous distribution may be approximated by N discrete equally probable points, such that the mean and standard deviation of these N points is equal to the original mean and standard deviation. The gain in NPV that is due to ACS implementation is calculated for each of these N scenarios. The mean $\mu$ (and standard deviation $\sigma$) of the NPV gain for the stochastic case is then the weighted NPV gain (and weighted standard deviation) of the N possible scenarios as shown in Equations (1) and (2), where there is only one uncertain parameter, m=1, so that N=n.

Once the objective function is formulated, the utility function presented in the '935 application may be used and a stochastic optimization may be performed using the weighted mean, $\mu$, and the weighted standard deviation, $\sigma$, of the NPV gains calculated for these N scenarios, $$F_\lambda = \mu - \lambda \sigma \qquad (3)$$

where $\lambda$ is a risk aversion factor chosen from a set of preferred risk aversion levels. The objective function maximizes $\mu$ for a given $\sigma$ or minimizes $\sigma 0$ for a given $\mu$. A value of $\lambda$ equal to zero causes the optimization algorithm to maximize the mean without concern for the standard deviation. As the value of $\lambda$ increases, the optimization algorithm puts more weight into minimizing the standard deviation; i.e., it reduces risk. If the gains in NPV of the various individual scenarios are assumed to be normally distributed, then the weighted mean corresponds to a 50% confidence level for $\lambda$ equal to zero ($F_\lambda = \mu$). When $\lambda$ is equal to 1, the function being optimized is ($F_\lambda = \mu - 1\sigma$), and the gain is maximized at an 84% confidence level.

For the analysis here, three equally probable widths of the high permeability zone (N=3) are used. Table 2 below is the decision table that summarizes the gains achieved at various confidence levels.

TABLE 2

Decision table for cost-benefit analysis with uncertainty in the width of the high-permeability zone.

| λ | Confidence Level[a] | Function Optimized[b] | Flow Rates (bpd) (f1/f2/f3) | Gain | Benefit > Cost[c] |
|---|---|---|---|---|---|
| 0 | 50% | $F = \mu - 0\sigma$ | 947/743/8310 | $10.37 million | Yes |
| 1 | 84% | $F = \mu - 1\sigma$ | 10/2986/7004 | $7.35 million | Yes |
| 2 | 97.7% | $F = \mu - 2\sigma$ | 189/3412/6399 | $5.85 million | Yes |

Figure 3:
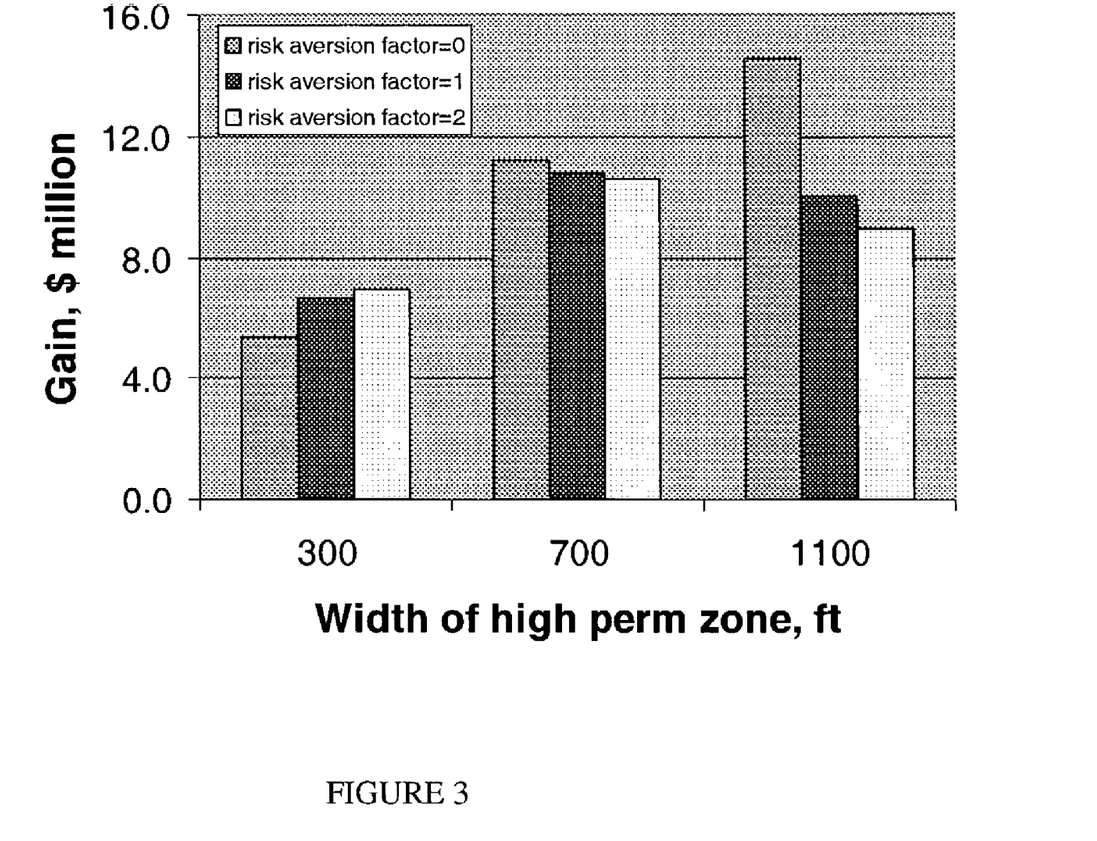
FIG. 3 is a chart depicting the distribution in individual gains in NPV of three equally probable reservoir model scenarios for the stochastic reservoir with uncertainty in one parameter (the width of the high permeability zone) for three risk aversion factors; increasing the risk aversion factor shifts the distribution to increase gains at the lower end of the histogram

[a] assuming normal distribution
[b] optimization done by tuning three flow rates and honoring constraints
[c] cost of 3 ACS = $2.25 million Each optimization yields a set of flow rates and is the optimum strategy to be employed at the corresponding confidence level. As the risk aversion factor (or confidence level) increases, both the gain and the risk decrease. For this reservoir, even at the 97.7% confidence level, the cost of the ACS is paid back in 2 years. FIG. 3 shows the distribution of the individual gains for the three equally probable scenarios at three confidence levels. Note that as the risk aversion factor (or confidence level) increases, the optimization alogrithm increases the gain at the lower end of the histogram and decreases it at the higher end. This shift ensures that the weighted gain at the higher confidence level is maximized and the standard deviation is reduced.

These results can be used in various ways. First, given the uncertainty in the width of the high-permeability zone, a decision as to whether to implement ACS may be made. An examination of the gains at various confidence levels shows whether the gain covers the investment. If it pays back at the 97.7% level, the technology is probably worth implementing. Table 2 thus provides a decision-making tool to evaluate the risk-reward of using this technology.

Second, the optimum flow rates point to an optimum operating strategy. Depending on the confidence level, the flow rates that are most likely to lead to that specific gain may be chosen, assuming no more analysis or measurements are performed to reduce the uncertainty in the width of the high-permeability zone. This leads to a third benefit: value of information (i.e., sensor value). The uncertainty in the gain achieved is due to the uncertainty in the reservoir property; i.e., the width of its high-permeability zone. Thus, any measurement that could reduce the uncertainty in this property will consequently reduce the uncertainty in the gain achieved or, at the same confidence level, increase the gain to be realized. This additional improvement in gain is obviously the value of the measurement used to obtain additional reservoir information (which will be described in more detail below with respect to value of information).

Stochastic reservoir optimization—two or more uncertain parameters: Now a second uncertainty, aquifer strength is introduced using the same example as above. As before, a normal distribution is assumed for both the variation in the width of this zone (mean of 700 ft and a standard deviation of 327 ft) and the aquifer PI (mean 4500 bpd/psi and standard deviation of 2858 bpd/psi). For the case of two uncertain parameters considered here, there will be $N=n^2$ (m=2) equally probable scenarios, see equations (1) and (2) above. The gain in NPV due to ACS implementation is calculated for each of these equally probable scenarios. The mean $\mu$ (and standard deviation $\sigma$) of the NPV gain for the stochastic case is then the weighted NPV gain (and weighted standard deviation) of the N possible scenarios, as described by equations (1) and (2) above, where $w_i$ here is 1/N and $g_i$ is the gain in NPV for scenario i.

Because the reference case NPV is a function of two uncertain parameters, it is important, as explained above, to define the objective function as the gain in NPV rather than an absolute value.

Figure 4:
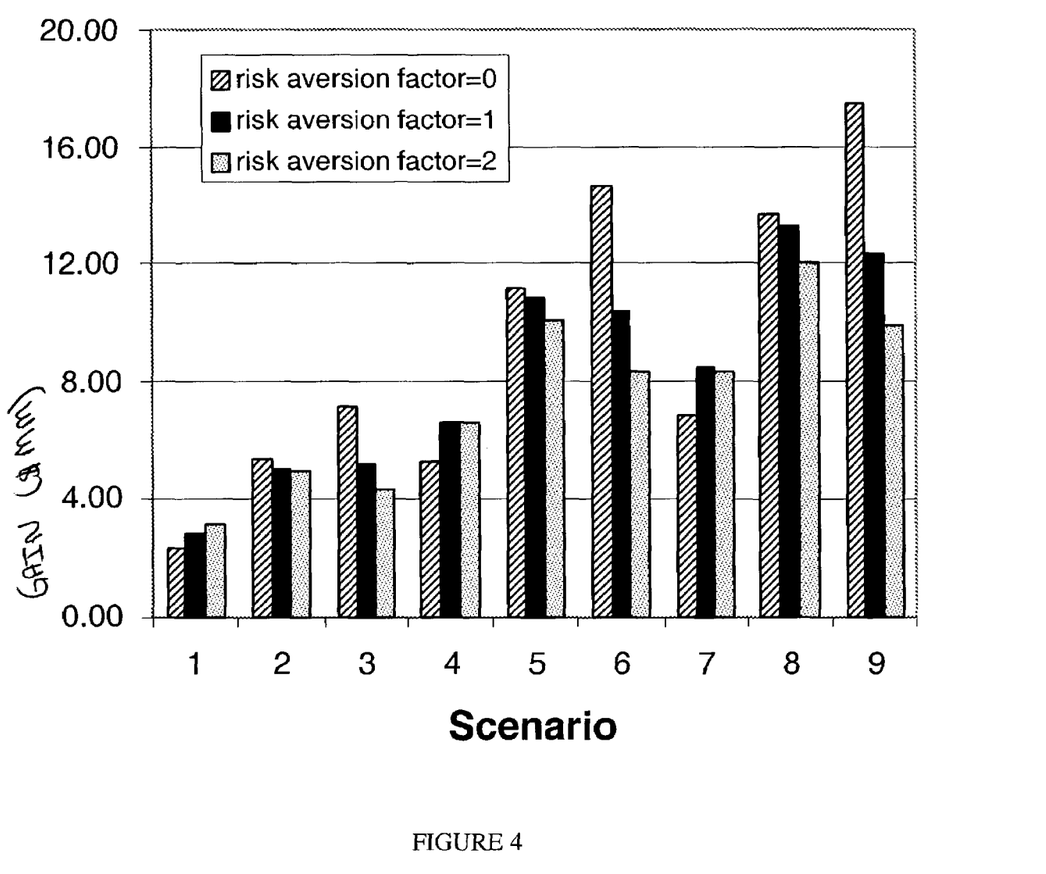
FIG. 4 is a chart depicting the distribution in individual gains in NPV of the nine equally probable reservoir model scenarios for the stochastic reservoir with uncertainty in two parameters (the width of the high permeability zone and aquifer PI) for three risk aversion factors.

Following the method proposed above, a stochastic optimization may be performed. The optimization is done using the weighted mean, $\mu$ and the weighted standard deviation, $\sigma$, of the NPV gains calculated for these N scenarios. An objective function may be constructed for this case by choosing to optimize a linear combination of the mean and standard deviation, as described by equation (3) above, where $\lambda$ is a risk aversion factor chosen from a set of preferred risk aversion levels. As above, the objective function maximizes $\mu$ for a given $\sigma$ or minimizes $\sigma$ for a given $\mu$. A value of $\lambda$ equal to zero causes the optimization algorithm to maximize the mean without concern for the standard deviation. As the value of $\lambda$ increases, the optimization algorithm puts more weight into minimizing the standard deviation, i.e., it reduces risk. If the gains in NPV of the various individual scenarios are assumed to be normally distributed, then the weighted mean corresponds to a 50% confidence level or a $\lambda$ equal to zero in equation (3). When $\lambda$ is equal to one, the function being optimized is $(\mu-\sigma)$, and the gain, assumed normally distributed, is maximized at an 84% confidence level. For the analysis here, three equally probable points for each uncertain variable (n=3) are used. Table 3 below summarizes the gains achieved at various confidence levels. Each optimization yields a set of flow rates and reflects the optimum strategy to be employed at the corresponding confidence level. As the risk aversion factor increases, the gain decreases but the spread in the gains also decreases. Thus, confidence about the result increases. For the reservoir of the present example, at the 84% confidence level, the cost of the ACS is paid back in two years but not at the 97.7% confidence level. FIG. 4 shows the distribution of the individual gains for the nine equally probable scenarios at three confidence levels. Increasing the risk aversion factor shifts the distribution to increase gains at the lower end of the histogram. Note that as the confidence level (or risk aversion factor) increases, the optimization algorithm changes the distribution by increasing the gain at the lower end of the histogram and decreasing it at the higher end. This shift ensures that the spread in gains is reduced (the standard deviation is reduced) and the weighted gain at the higher confidence level is maximized.

TABLE 3

Decision table for cost-benefit analysis of implementing ACS technology at various confidence levels in the presence of uncertainty in width of high permeability zone and aquifer PI.

| λ | Confidence Level* | Function optimized | Gain | Benefit>Cost**? |
|---|---|---|---|---|
| 0 | 50% | $F = \mu - 0\sigma$ | $9.33 MM | Yes |
| 1 | 84% | $F = \mu - 1\sigma$ | $4.88 MM | Yes |
| 2 | 97.7% | $F = \mu - 2\sigma$ | $1.88 MM | No |

*assumes normal distribution
**cost of three ACS is estimated to be $2.25 MM

These results can be used in various ways as described above. First, given the uncertainty in the two properties, a decision on the implementation of three ACS may be made. By examining the gains at the various preferred confidence levels, it can be determined whether the gain covers the investment. Table 3 thus provides a tool to evaluate the risk-reward of using this technology. Second, the optimum flow rates obtained for each λ point to an optimum operating strategy. Depending on the confidence level, the optimum flow rates that would ensure at least that gain may be identified (assuming that no more analysis or measurements are performed to reduce the uncertainty in the properties). This leads to the third application of this tool, which is the valuation of information (such as that collected by using sensors and making measurements) discussed below.

The above example considers only whether or not to implement a single strategy. The above example and decision tables may be repeated to account for one or more competing strategies and the gains compared at common risk aversion levels.

2. Valuation of Information (i.e., Sensor Value)

The risk factor in reservoir management arises due to uncertainty in physical and financial parameters associated with the reservoir. Minimizing the risk level involves gathering information about these parameters to reduce or eliminate the inherent uncertainties. Gathering information involves making a new measurement, implementing a new sensor, etc. Based on the physics of the measurement and the interpretation of the information, the uncertainty may be partially or completely eliminated. The cost of gathering this information should be balanced against the value the information brings to the stochastic optimization process through increased value of the goal being optimized (such as NPV). The quantification of the value of information is a valuable aid in designing measurement strategies to reduce uncertainties and, therefore, risk levels in reservoir management. When the uncertainty is completely eliminated, the value of information becomes the value of perfect information. This is demonstrated using the example of the reservoir with two uncertainties discussed above.

The decision table for the example (see Table 3) provides the associated risk level for each gain. The uncertainty in the realizable gain is due to the uncertainty in the reservoir properties—the width of its high permeability zone and the aquifer strength in the example introduced above. Thus, if the width is very small, then the gain due to the ACS is lower. To minimize the downside risk of the decision to implement ACS, one can optimize with a higher risk aversion factor and perform a cost-benefit analysis with a higher confidence. The next logical decision is to further minimize the risk associated with this decision by implementing a monitoring strategy that yields information about the reservoir properties, such as a logging suite or permanent sensors. Thus, any measurement that could reduce the uncertainty in these properties will consequently reduce the uncertainty in the gain achieved or, at the same confidence level, increase the gain to be realized. This additional improvement in gain is the value of the measurement or sensor used and is the value of information. The value of this information is the additional benefit it brings to reservoir management goals (either in terms of better NPV, higher hydrocarbon production, etc.) when the uncertainty in the property is reduced. By comparing the added benefit of a measurement with the cost of the measurement, a decision on performing the measurement may be made.

Figure 1B:
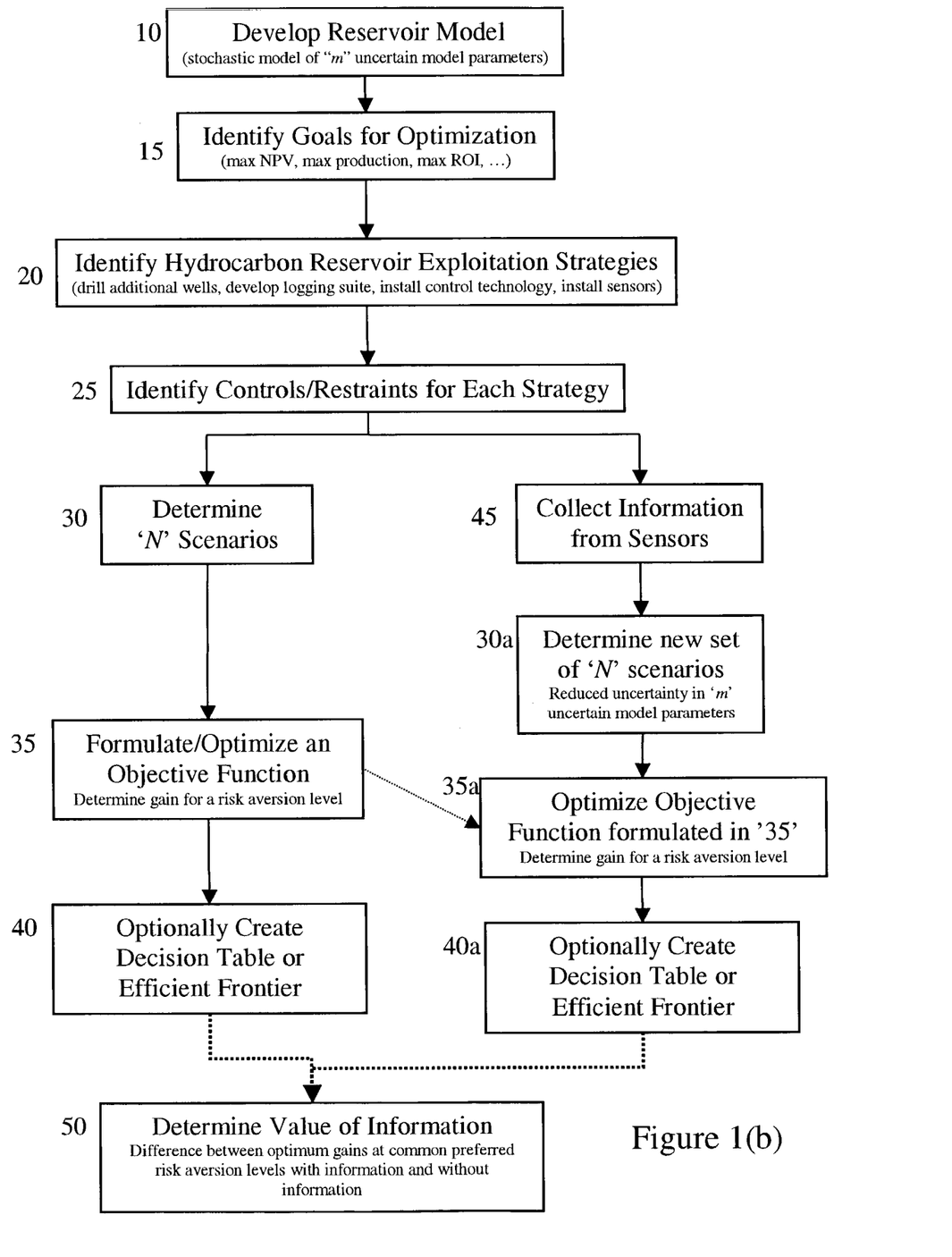
FIG. 1(b) is a schematic accounting for the value of information.

As shown in FIG. 1(b), in addition to the stochastic determination of FIG. 1(a), a new set of N equally probable scenarios 30a may be determined based on the expected reduction in uncertainty due to additional information that would be collected if sensors were deployed or new measurements, etc. made 45. Such information would potentially reduce the uncertainty in the one or more of the 'm' uncertain parameters 10. Stochastic optimization 35a over this new set of N scenarios 30a (using the previously developed objective function 35) would yield a new decision table/efficient frontier 40a. The gain in the value of the goal (such as NPV) attributable to the collected information may be calculated by taking the difference between expected optimum gain with additional information and reduced uncertainty and the optimum gain determined without the information at common preferred risk aversion levels 50. If this expected increase in gain is more than the cost of collecting the information, then the decision may be made to collect additional information, such as by deploying sensors and Making new measurements.

Figure 1C:
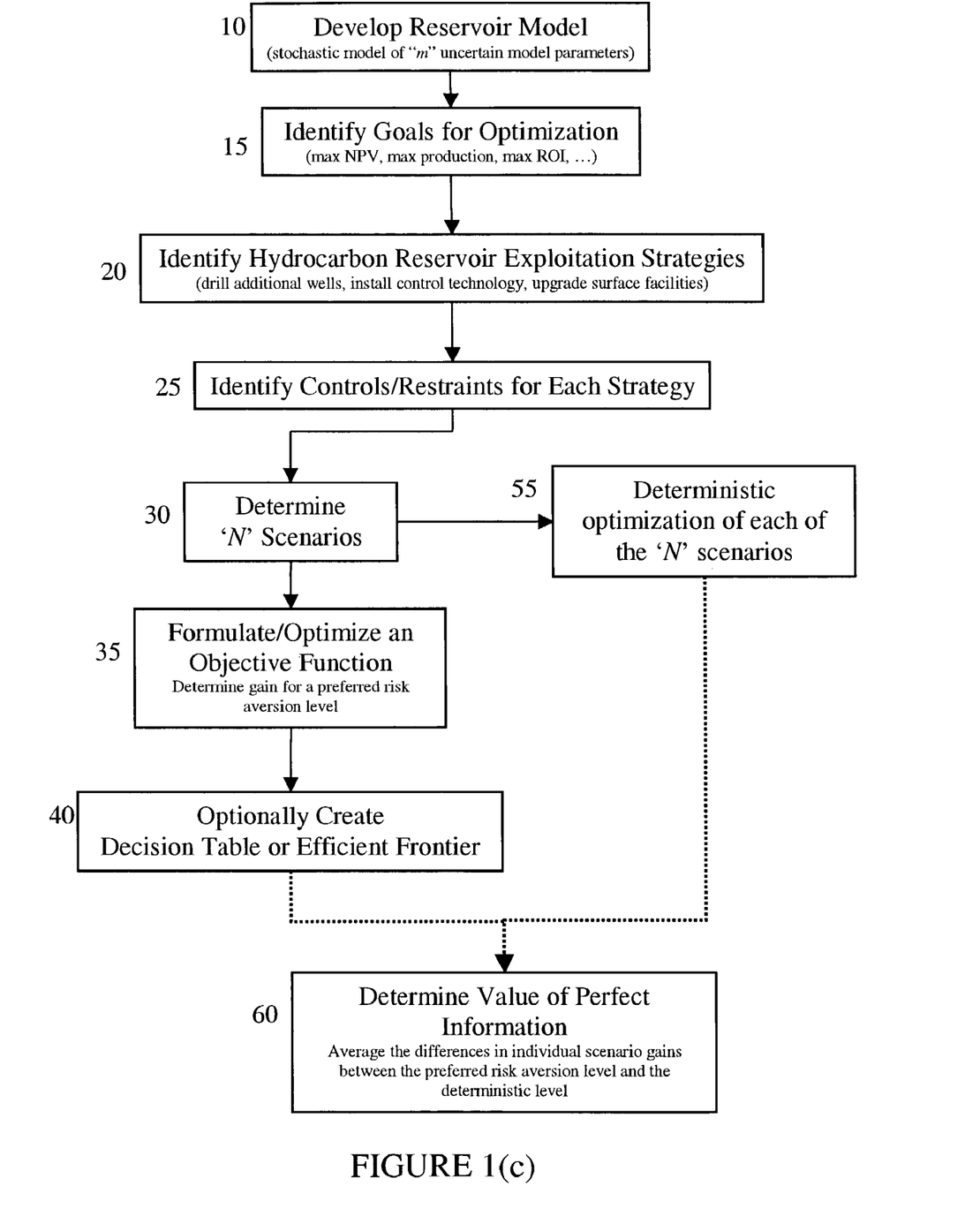
FIG. 1(c) is a schematic accounting for the value of perfect information.

Value of perfect information: If it is assumed that the measurements made completely eliminate all uncertainty, then the expected increase in gain attributable to those measurements is the value of perfect information. Accordingly, another embodiment of the invention as shown in FIG. 1(c) could include treating each one of the 'N' equally probable scenarios 30 as deterministic and optimizing them independently 55. The difference between the gain obtained by deterministic optimization of a scenario (100% confidence level) and the individual gain of that scenario at a preferred risk level 35 is the maximum potential value of completely eliminating the uncertainty (i.e., the value of perfect information) if that scenario happens to be the true scenario for the reservoir model. Because the true scenario is unknown a priori, the value of perfect information is obtained by taking the average 60 of these values for all the 'N' equally probable scenarios.

Using the example with two uncertainties described above, the methodology for estimating the value of perfect information is further described below.

EXAMPLE

Figure 5:
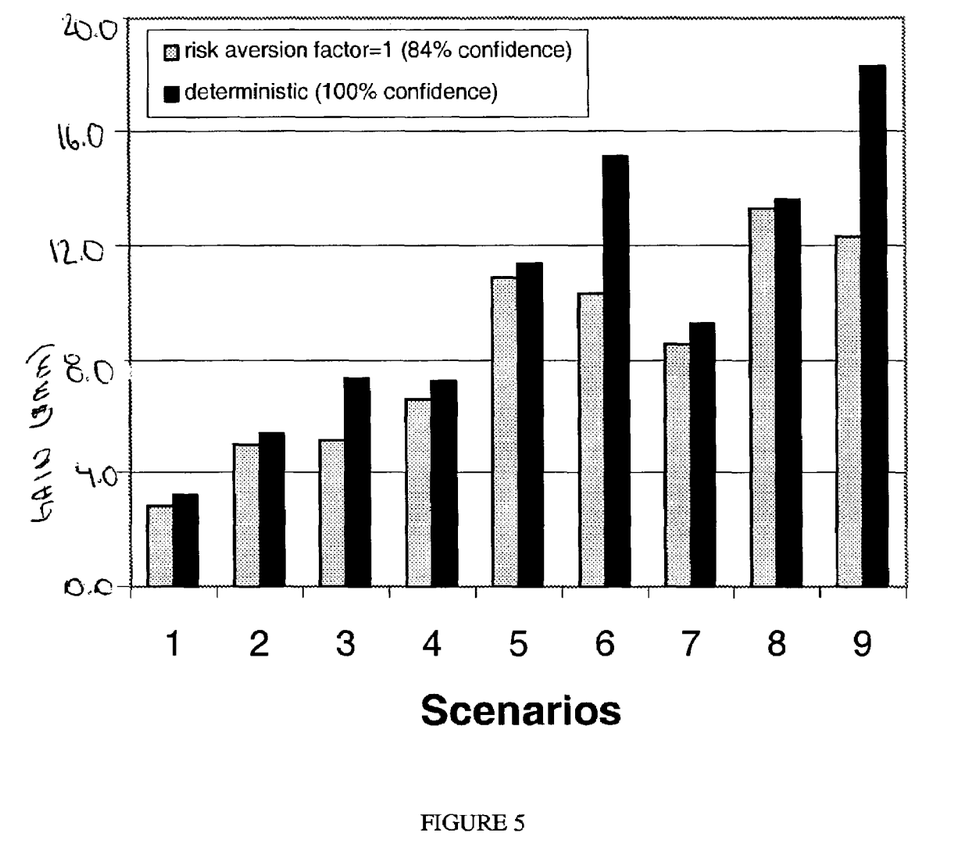
FIG. 5 is a chart comparing distribution in individual gains in NPV of nine equally probable reservoir model scenarios using an optimum strategy with confidence levels of 84% and 100%.

FIG. 4 shows the gains for the nine equally probable scenarios at the optimized flow rates for the 50%, 84% and 97.7% confidence levels (where the risk aversion factors, λ, are 0, 1 and 2, respectively). If each of these scenarios is treated independently in a deterministic sense, then the individual optimum for the nine cases can be obtained by a deterministic optimization. This is shown in FIG. 5 as the deterministic gain and corresponds to the 100% confidence level. The light columns are the gains for the nine individual scenarios when the optimum strategy corresponding to a preferred risk aversion factor of 1 (confidence level 84%) is used. The dark columns correspond to the maximum gain attained when each of these scenarios is treated in a deterministic sense. The difference between these two gains is the maximum potential benefit of measurements and is referred to the value of perfect information. Thus, if the true width is determined to be 1,100 feet and the aquifer strength (PI) is 4,500 bpd/psi (scenario 6), then this scenario may be optimized deterministically and the flow rates to the optimum settings may be tuned. This would yield a gain in NPV of $15.2 MM.

Using the stochastic optimization, at the 84% confidence level (risk aversion factor of 1), the NPV of the same scenario is $10.4 MM. The additional increase in gain ($4.8 MM) over that chosen confidence level, i.e., the difference between these two values, is the potential benefit realized by completely eliminating the uncertainty in these properties. This is the maximum potential value of perfect information, such as from a sensor measurement. Because a stochastic model with nine equally probable scenarios is used, and there is no a priori knowledge of the true scenario, there is a distribution associated with this value (differences between the maximum gain and the 84% confidence level in FIG. 5). The average value of perfect information of this distribution is $1.8 MM; this value provides a guide in designing and pricing a measurement strategy for resolving uncertainty. The cost of the additional measurements need not just be the cost of the hardware, but may also include other factors, such as the price for interpretation skills. Thus, for a permanently installed downhole pressure gauge, for example, the hardware may be priced alone or the interpretation of the data may be priced as a function of time. Various pricing models may also be designed to charge different rates for measurements at different stages in the production based on the perceived value of the information at different times.

The value of perfect information is an upper limit to the benefit of a measurement in this case. In reality, the actual benefit would depend on the type of measurement made (i.e., sensor used), the ease of its interpretation, the time stage in production at which this information is obtained, and the extent to which the uncertainty is eliminated. Using the methodology outlined in FIG. 1($b$), one could estimate the value of information due to measurement for partial uncertainty reductions and perform a cost-benefit analysis.

Figure 6:
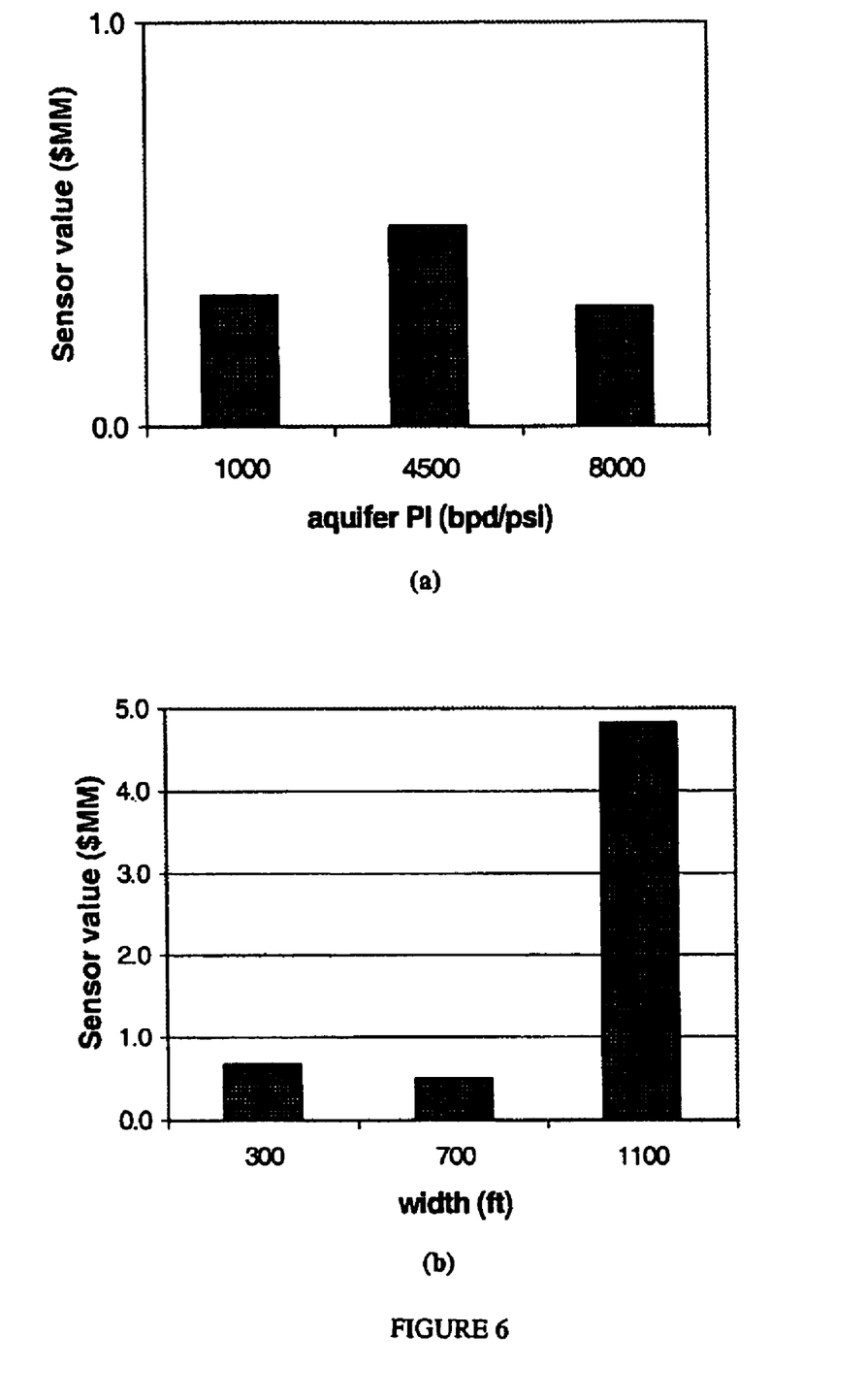

Further analysis may be performed to determine which of the many uncertain properties (two or more) is more important to the sensing process. FIG. 6($a$) plots the value of perfect information (i.e., sensor value) as a function of aquifer PI for a fixed width. It is seen that resolving the uncertainty in the aquifer strength does not make a big impact on added value. FIG. 6($b$) plots the sensor value as a function of width for a fixed aquifer PI. Here, there is a big impact if the uncertainty in the width of the high permeability zone can be resolved. It is clear that a measurement removing the uncertainty in the width is more beneficial. Such sensitivity analysis is a further aid in designing monitoring strategies. The higher sensitivity to the width of the high permeability zone suggests that there is more value in designing a measurement to eliminate or reduce uncertainty in the width of the high permeability zone rather than the aquifer PI. Thus, a stochastic evaluation allows valuation of information and provides a tool to design strategy for extracting information about the reservoir with physical uncertainties by using various methods including wireline logging, logging-while-drilling and permanent sensors.

The reservoir risk management methodologies presented herein can help determine the benefit of implementing a specific technology or exploitation strategy and the gain to be realized by selecting a suitable monitoring strategy. Stochastic optimization using a linear combination of weighted mean gains and standard deviation of gains enables determination of gains from these technologies at various risk aversions levels. The technique has been demonstrated for valuation of ACS technologies in a reservoir with uncertainty in one or more properties. A decision-making table showing gains at various confidence levels facilitates cost-benefit analysis. The value of information is estimated by calculating the additional increase in gain that is due to partial or total elimination of uncertainty in the reservoir parameters. Such valuation is important in determining the merits of applying the technology and/or collecting information in a stochastic reservoir as well as in pricing them.

The invention has been described herein with reference to certain examples and embodiments. It will, however, be evident that various modifications and changes may be made to the embodiments described above without departing from the scope of the invention as claimed.

We claim:

1. A method for managing risk associated with one or more hydrocarbon reservoir exploitation strategies used for determining one or more risk management decisions, the method comprising:
   a. developing a reservoir model that incorporates a stochastic model of one or more uncertain model parameters;
   b. identifying one or more goals for optimization;
   c. identifying said one or more hydrocarbon reservoir exploitation strategies for achieving said one or more goals based on said reservoir model and associated uncertain parameters;
   d. identifying control variables and constraints associated with each of said one or more hydrocarbon reservoir exploitation strategies;
   e. identifying a set of equally probable reservoir model scenarios;
   f. formulating an objective function based on said one or more goals to determine the gain in value attributable to said one or more hydrocarbon reservoir exploitation strategies; and
   g. optimizing said objective function via at least one processor by using said set of scenarios and said control variables and constraints for each of said one or more hydrocarbon reservoir exploitation strategies to determine the optimum gain in value at a plurality of risk levels;
   h. creating a risk reward summary to analyze the determined optimum gain in value at said plurality of risk levels corresponding to said one or more hydrocarbon reservoir exploitation strategies that identifies said one or more risk management decision to optimize reservoir production value; and
   wherein said objective function is defined as $$F_\lambda = \mu - \lambda\sigma$$

wherein $$\mu = \sum_i w_i g_i,$$

$$\sigma = \sqrt{\sum_i w_i (g_i - \mu)^2}$$

$$w_i = 1/N$$

$$N = n^m;$$

such that, F is said objective function, $\lambda$ is a risk aversion level, $\mu$ is a mean of the gains in value of the goal and the standard deviation, $\sigma$ is the standard deviation of these gains, N is the set of equally probable scenarios, $g_i$, is the gain for i$^{th}$ scenario; n is the number of discrete points in each of said one or more uncertain parameters; and m is the number of uncertain parameters.

2. The method of claim 1, wherein said one or more optimized goal is selected from the group consisting of maximizing net present value, maximizing hydrocarbon production, maximizing return on investment, minimizing cost, and maximizing reservoir hydrocarbon drainage.

3. The method of claim 1, wherein said one or more hydrocarbon reservoir exploitation strategies are selected from the group consisting of installing control technology, drilling additional wells, upgrading surface facilities and performing well workovers.

4. The method of claim 1, further comprising:
  i. collecting additional information;
  j. determining a second set of scenarios based on said additional information; and
  k. optimizing said objective function based on said second set of scenarios to determine the optimum gain at two or more risk aversion levels.

5. The method of claim 4, further comprising:
  l. comparing the gain from (g) to the gain from (k) at two or more common preferred risk aversion levels to determine the value of said additional information.

6. The method of claim 1, further comprising:
  i. formulating a second objective function wherein one of said set of scenarios is assumed to be deterministic;
  j. deterministically optimizing said second objective function to determine the gain attributable to the deterministic treatment of said scenario;
  k. determining the difference between the gain of (i) and the gain of (g) at a preferred risk level; and
  l. repeating (i), (j), and (k) for each scenario.

7. The method of claim 6, further comprising:
  m. determining the average of the differences in gains obtained in (l) to determine the value of perfect information.

8. The method of claim 1, further comprising developing a decision table or efficient frontier based on the gain in value of the goal attributable to each of said one or more decision strategies.

9. The method of claim 1, wherein the objective function accounts for the cost associated with each of said one or more exploitation strategies.

10. The method of claim 1, further comprising a pricing model.

11. The method of claim 10, wherein said pricing model is stochastic.

* * * * *